(12) United States Patent
Nishimura et al.

(10) Patent No.: US 7,730,624 B2
(45) Date of Patent: Jun. 8, 2010

(54) LASER MARKER

(75) Inventors: Takashi Nishimura, Hitachinaka (JP); Junichi Sudou, Hitachinaka (JP)

(73) Assignee: Hitachi Koki Co., Ltd., Tokyo (JP)

( * ) Notice: Subject to any disclaimer, the term of this patent is extended or adjusted under 35 U.S.C. 154(b) by 51 days.

(21) Appl. No.: 12/048,293

(22) Filed: Mar. 14, 2008

(65) Prior Publication Data

US 2008/0222905 A1    Sep. 18, 2008

(30) Foreign Application Priority Data

Mar. 15, 2007    (JP) .............................. 2007-066103

(51) Int. Cl.
*G01C 15/00*    (2006.01)
*G01C 5/00*    (2006.01)

(52) U.S. Cl. ...................... 33/286; 33/290; 33/DIG. 21

(58) Field of Classification Search .................. 33/286, 33/265, DIG. 21, 281, 282, 285, 290, 291, 33/293; 124/87

See application file for complete search history.

(56) References Cited

U.S. PATENT DOCUMENTS 3,128,384 A * 4/1964 Nelson et al. ............... 250/205
3,833,799 A * 9/1974 Audet .......................... 42/132
4,170,071 A * 10/1979 Mann et al. .................... 33/265
6,494,604 B2 * 12/2002 Khoshnood ................. 362/577
7,412,774 B2 * 8/2008 Lu et al. ....................... 33/290
2006/0280212 A1 * 12/2006 Lu et al. .................. 372/38.02

FOREIGN PATENT DOCUMENTS

JP    2004-109509    4/2004

* cited by examiner

*Primary Examiner*—Amy Cohen Johnson
(74) *Attorney, Agent, or Firm*—Antonelli, Terry, Stout & Kraus, LLP.

(57) ABSTRACT

A laser marker capable of emitting laser light with its optimum intensity in accordance with a level of illuminance at any environment where the laser marker is used. The laser marker includes a stand and a cover rotatably provided on the stand. The cover accommodates therein a laser unit that emits laser light outside of the cover through a window formed in the cover. Laser light intensity changing unit is provided, which changes the intensity of the laser light to be emitted from the laser unit in accordance with the illuminance at the environment, the illuminance being detected by a illuminance sensor provided on the cover.

5 Claims, 4 Drawing Sheets

LASER MARKER

BACKGROUND OF THE INVENTION

The present invention relates to a laser marker for use in positioning work at construction sites.

A laser marker used in positioning work at construction sites emits laser light serving as a reference line. FIG. 7 shows one example of a conventional laser marker 101. The laser marker 101 includes a stand 102 and a cover 103 rotatably mounted on the stand 102. The cover 103 accommodates therein a laser unit 104. The cover 103 has a window (not shown) through which a laser light passes.

The laser unit 104 has a lens unit 106 including a laser light source. The laser unit also includes a lens 107 adapted for receiving laser light emitted from the lens unit 106 and converting the laser light to a line beam. The line beam (i.e., horizontal line beam or vertical line beam) emitted from the lens 107 are applied outside the cover 103 through the window (not shown), and are utilized in positioning work at a construction site. Such a laser marker is described in laid-open Japanese Patent Application Kokai No. 2004-109509.

The laser marker may be used in a bright place or a dark place. In the bright place, the laser line beam has low contrast because of bright ambient atmosphere. Visibility to the laser line beam may be lowered if intensity of ambient light is high, which may lower the positioning workability. On the other hand, in a dark place, the laser line beam has high contrast and can be clearly seen. However, the laser line beam may glare, inevitably tiring the user's eyes, particularly when the user gazes at the laser beam. In this case also, working efficiency may be lowered.

SUMMARY

It is therefore an object of the present invention to provide a laser marker capable of emitting such a laser light beam easily visible to a user, regardless of brightness of ambient condition where the laser marker is used.

This and other object of the present invention will be attained by a laser marker used at an environment including a stand, a cover, a laser unit and an intensity changing unit. The cover is provided on the stand and has a window. The laser unit is provided in the cover and is configured to emit laser light beam toward outside of the cover through the window. The intensity changing unit changes an intensity of the laser light beam to be emitted from the laser unit in accordance with a level of illuminance at the environment.

EMBODIMENT

Figure 1:
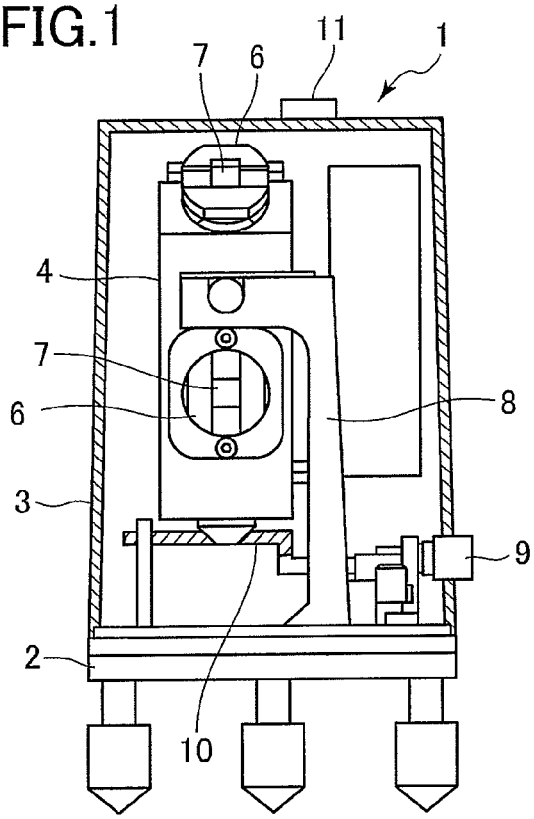
FIG. 1 is a front cross-sectional view of a laser marker according to an embodiment of the present invention.
Figure 2:
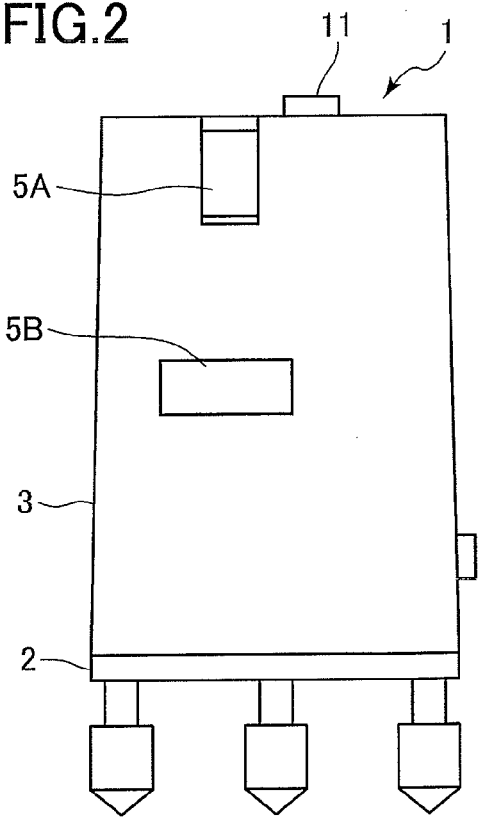
FIG. 2 is a front view of the laser marker according to the embodiment.
Figure 3:
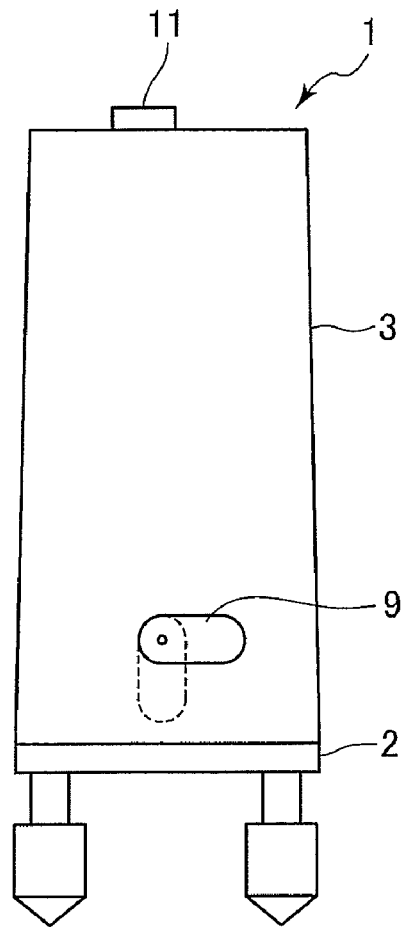
FIG. 3 is a side view of the laser marker according to the embodiment.

A laser marker according to an embodiment of the present invention will be described with reference to FIGS. 1 to 6. As shown in FIG. 1, a laser marker 1 has a stand 2, a cover 3, and a laser unit 4. The cover 3 is mounted on the stand 2 and is rotatable thereon about its longitudinal axis. The laser unit 4 is provided in the cover 3. As shown in FIG. 2, the cover 3 has one side formed with two rectangular windows 5A, 5B, one above the other for allowing a laser light to pass therethrough.

The laser unit 4 has a lens unit 6 including a laser light source, and a lens 7 for receiving laser light emitted from the lens unit 6 and converting the laser light to a line beam. The line beam (i.e., horizontal line and vertical line) emitted from the lens 7 can be directed outside through the window 5 (see FIG. 2). That is, the vertical line beam passes through the upper window 5A, whereas the horizontal line beam passes through the lower window 5B.

As shown in FIG. 1, a frame 8 upstands from the stand 2 for supporting the laser unit 4. That is, the laser unit 4 is pivotally movable with respect to the frame 8 for maintaining a vertical orientation thereof through a gimbal mechanism (not shown). A power switch lever 9 protrudes from the cover 3, and a retainer 10 is provided in interlocking relation to a movement of the power switch lever 9 so as to selectively fix the orientation of the laser unit 4.

An illuminance sensor 11 is provided on a top of the cover 3. The illuminance sensor 11 is adapted to measure the illuminance at an ambient environment where the laser marker 1 is used. In accordance with the measurement of the illuminance by the sensor 11, an intensity of the laser light to be emitted from the laser unit 4 is variable. More specifically, the higher the illuminance measured by the illuminance sensor 11, the higher the intensity of the laser light emitted from the laser unit 4, whereas the intensity of the laser light is controlled to be low if the laser marker 1 is used in a dark place where the illuminance is low.

Figure 5:
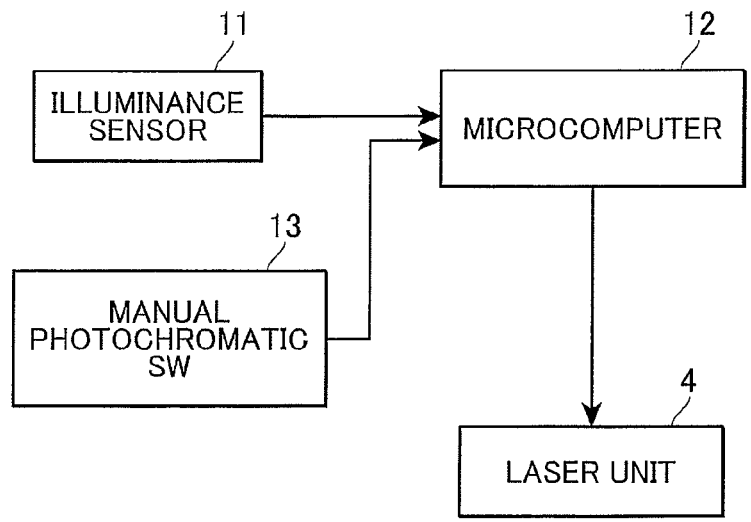
FIG. 5 is a block diagram showing a configuration of a control system incorporated in the laser marker according to the embodiment.

A configuration of a control system that changes the intensity of the laser light based on the illuminance at the environment where the laser marker 1 is used will be described with reference to a block diagram of FIG. 5. The illuminance sensor 11 is connected to a microcomputer 12 and transmits the illuminance data such as a brilliant brightness, ordinary brightness and dark brightness, to the microcomputer 12.

The illuminance sensor 11 is designed to convert the intensity of the light into a photoelectric current and to output the photoelectric current. That is, large level photoelectric current is output if the illuminance is high at the environment where the laser marker 1 is used, that is, the environment is bright. Conversely, small level photoelectric current is output if the illuminance is low at the environment, that is, the environment is dark.

Figure 4:
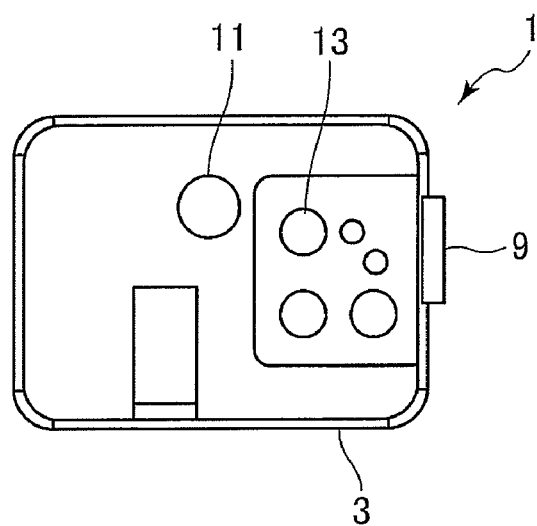
FIG. 4 is a plan view of the laser marker according to the embodiment.

The microcomputer 12 is adapted to receive the illuminance data (value of the photoelectric current) acquired by the illuminance sensor 11 and determines an optimal intensity of the laser light based on the illuminance data. The microcomputer 12 generates a control signal to be sent to the laser unit 4 for adjusting intensity of the laser light to be emitted from the laser unit 4 to an optimal intensity value. As shown in FIG. 4, in the laser marker, a manual light-adjusting (photochromatic) switch 13 is provided on the top of the cover 3, so that the user can manually change the intensity of the laser light depending on the illuminance at the environment where the laser marker 1 is used.

Figure 6:
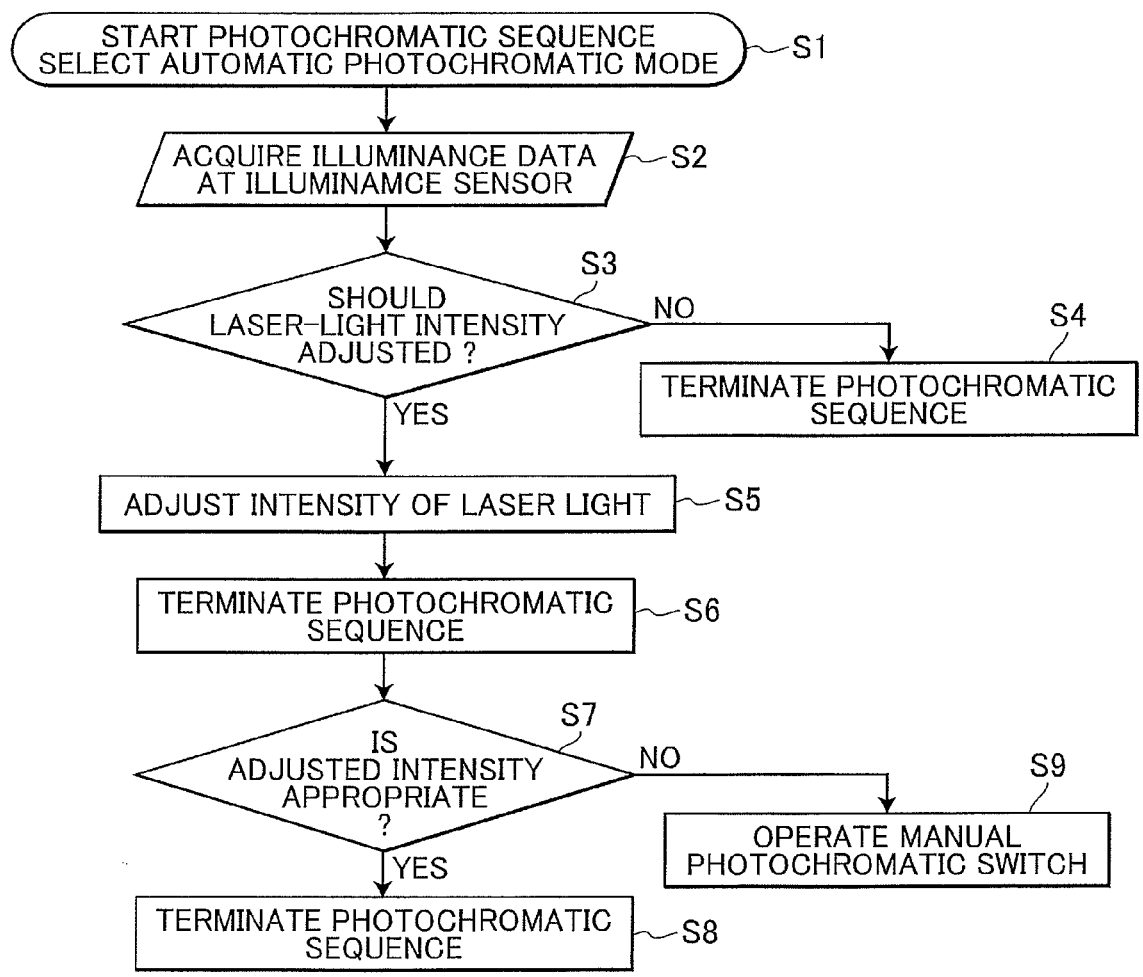
FIG. 6 is a flowchart showing a sequence of light adjustment executed in the laser marker according to the embodiment; and, FIG. 7 is a front cross-sectional view of a conventional laser marker.
Figure 7:
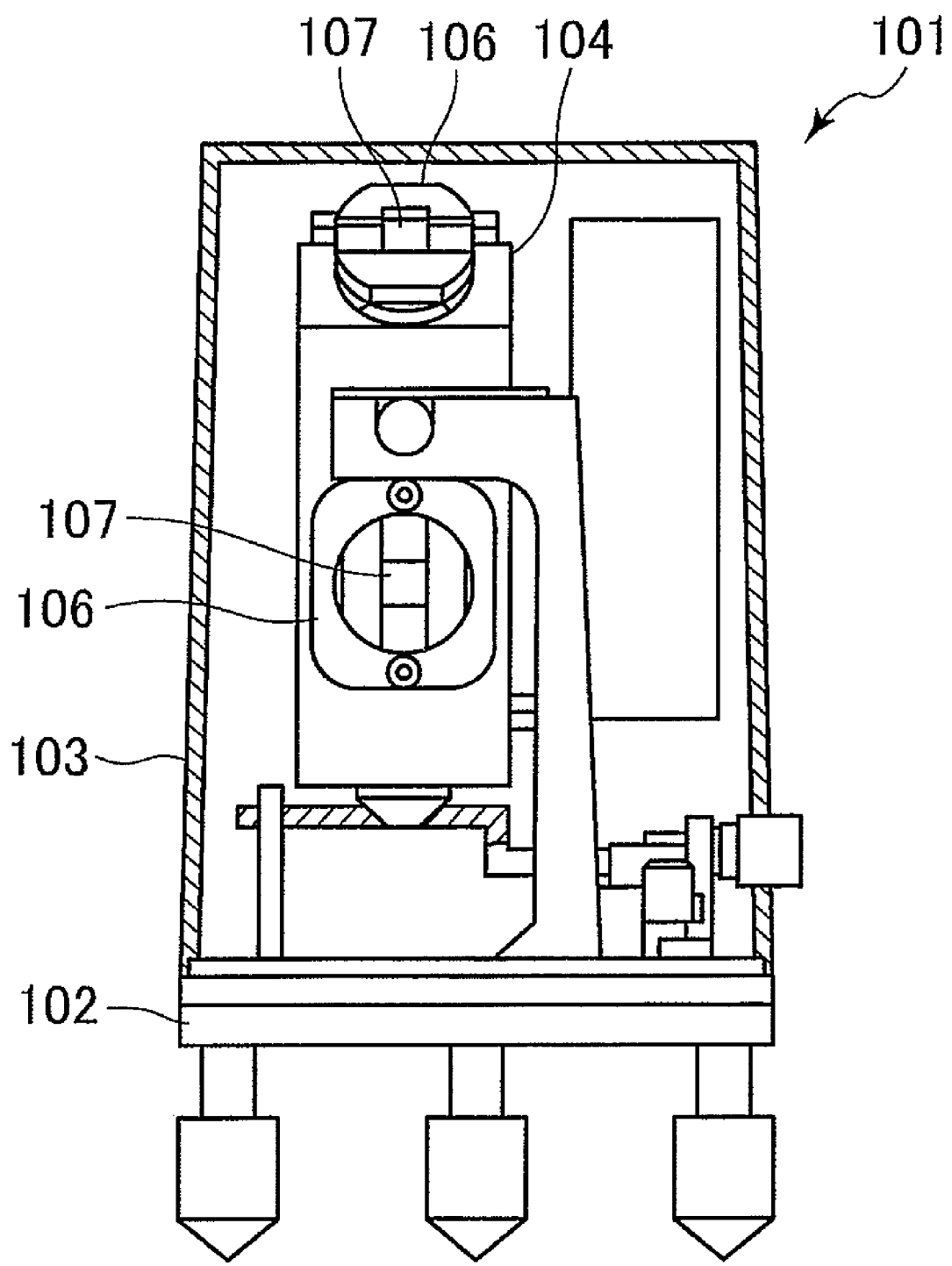

A process of adjusting the intensity of the laser light to be emitted from the laser unit 4 will be described with reference to a flowchart of FIG. 6.

First, an automatic light-adjusting (photochromatic) mode is selected, whereby the sequence of adjusting the intensity of the laser light is started (S1). Then, the illuminance sensor 11 measures the illuminance at the environment where the laser marker 1 is used (S2). The data representing the illuminance is transmitted to the microcomputer 12. The microcomputer 12 determines, based on the data, whether the intensity of the laser light to be emitted from the laser marker 1 should be adjusted or not (S3).

If the microcomputer 12 determines that the intensity of the laser light need not be adjusted (S3: No), the process of adjusting the intensity of the laser light is terminated (S4). If the microcomputer 12 determines that the intensity of the laser light should be adjusted (S3: Yes), the intensity of the laser light is controlled to an optimal value based on the illuminance at the environment where the laser marker 1 is used (S5 and S6).

In the present embodiment, the illuminance at the environment is classified into three grades, i.e., high (bright), intermediate (normal) and low (dark). If the illuminance is high (bright), the laser light is set to the high intensity. If the illuminance is low (dark), the laser light is set to the low intensity. If the illuminance is intermediate (normal), the laser light is set to the intermediate intensity.

One method of changing the intensity of the laser light is to change a drive current level supplied to the laser unit 104. If the drive current of the laser is decreased, the laser output (i.e., the intensity of the laser light) will be decreased. Conversely, if the drive current of the laser is increased, the laser output will be increased. Hence, if an optimal laser light intensity is set beforehand (for example, stored in a memory unit not shown) in accordance with the illuminance at the environment so that the user can see the laser light most clearly, optimum laser light intensity can be provided in accordance with the change in illuminance at the environment where the user works.

Another method of changing the intensity of the laser light is to change the duty ratio, i.e., ON/OFF ratio applied in driving the laser in pulse-emitting mode in which the laser is turned on and off at regular intervals. According to the other method, the laser output decreases if the proportion of OFF period is increased in driving the laser. Thus, if the illuminance of the environment where the user works is measured beforehand and if the duty ratio is beforehand controlled on the basis of the illuminance so that optimum laser beam intensity can be provided, the laser light can always be seen clearly in accordance with the change in illuminance at the environment where the user works. In other words, the laser beam is always clearly visible regardless of the change in illuminance at the ambient atmosphere.

After the laser light intensity has been adjusted, determination is made as to whether the laser-light intensity adjusted is appropriate or not (S7). If the intensity adjusted is appropriate (S7: Yes), the process is terminated (S8). If the intensity adjusted is not appropriate (S7: No), the user manually operates the manual photochromatic switch 13 for manually adjusting the intensity of the laser light to an optimal value (S9).

As described above, the intensity of the laser light to be emitted from the laser unit 4 can be changed in accordance with the illuminance at the environment. That is, in a bright place, the intensity of the laser light is increased, whereby the laser light can be seen clearly though its contrast lowers because of the ambient intensive light. Thus, the positioning work is not hindered by the bright environment. In a dark place, the intensity of the laser light is decreased, whereby the laser light never glares, not tiring the user's eyes even if the users gaze at the laser beam. This helps to enhance the working efficiency. The laser marker 1 can therefore emit laser light with optimum intensity, irrespective of the illuminance at the environment where the laser marker 1 is used.

Moreover, in the present embodiment, the intensity of the laser light can be automatically adjusted in accordance with the illuminance at the environment, which has been measured by the illuminance sensor 11. This reduces the burden on the user.

While the invention has been described in detail and with reference to the specific embodiment thereof, it would be apparent to those skilled in the art that various changes and modifications may be made therein without departing from the scope of the invention.

The invention claimed is:

1. A laser marker configured to be used in an environment comprising:
    a stand;
    a cover provided on the stand and including a window;
    a laser unit provided in the cover and configured to emit a laser light beam into the environment outside of the cover through the window; and
    an intensity changing unit that changes an intensity of the laser light beam to be emitted from the laser unit in accordance with a level of illuminance at the environment,
    further comprising an illuminance sensor provided on the cover and exposed to the environment; and
    wherein the intensity changing unit changes the intensity of the laser light in accordance with the level of illuminance measured by the illuminance sensor.

2. The laser marker according to claim 1, wherein the cover includes a longitudinal axis and is rotatable on the stand about the longitudinal axis.

3. The laser marker according to claim 1, wherein the intensity changing unit comprises a device that changes a level of a driving current to be applied to the laser unit.

4. The laser marker according to claim 1, wherein the laser unit is driven in pulse driving mode current, and
    wherein the intensity changing unit comprises a device that changes a duty ratio of the pulse driving mode.

5. The laser marker according to claim 1, wherein the intensity changing unit automatically changes the intensity of the laser light in accordance with the level of illuminance measured by the illuminance sensor.

* * * * *